(No Model.)
B. RENAULT & M. DESVERNAY.
ELECTROLYTE FOR SECONDARY BATTERIES.
No. 440,505. Patented Nov. 11, 1890.
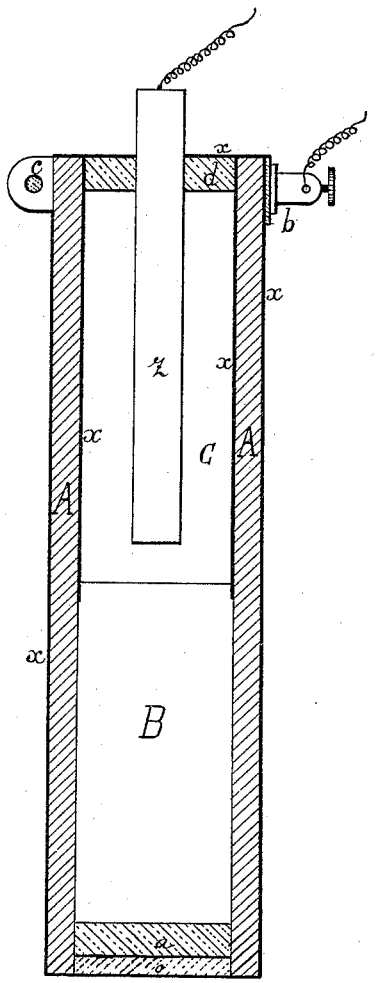
Witnesses
John Becker
Fred. White
Inventors:
Bernard Renault and Maurice Desvernay,
By their Attorneys,
Arthur E. Fraser & Co.

UNITED STATES PATENT OFFICE.

BERNARD RENAULT AND MAURICE DESVERNAY, OF PARIS, FRANCE.

ELECTROLYTE FOR SECONDARY BATTERIES.

SPECIFICATION forming part of Letters Patent No. 440,505, dated November 11, 1890.

Application filed January 11, 1890. Serial No. 336,706. (No model.) Patented in France June 11, 1889, No. 198,878.

*To all whom it may concern:*

Be it known that we, BERNARD RENAULT and MAURICE DESVERNAY, citizens of the Republic of France, and residing in Paris, France, have invented certain new and useful Improvements in Electric Batteries and Accumulators, of which the following is a specification.

This invention has been patented in France under date of June 11, 1889, No. 198,878.

Dry batteries, or those which act without liquid matters, have a certain number of uses for which they are employed in preference by reason of their convenient handling and the little care that they require. In order to augment the applications of such batteries it has been proposed to introduce as the basis for the active depolarizing matters (chromic acid, bichromates, mercurial salts, permanganates, &c.) a mass of gelatinous silica, which is a substance completely unattackable by these matters. In the preparation of batteries in this manner the method heretofore proposed has been to pour an alkaline silicate into the electrolyte, thereby forming a gelatinous mass in the battery-jar. When the gelatinous silicate is prepared in this manner, a clotty silicious precipitation results, the silicate incorporating imperfectly with the electrolyte. In order that the mixture may be uniform and homogeneous the agitation of the mass is necessary during the addition of the silicate; but this agitation is rendered extremely difficult if the operation takes place in the battery itself. Even when this solidification of the mass can be attained, the gelatinous silicate contracts after a little time and sets at liberty a considerable quantity of the electrolyte, forcing it out, as from a squeezed sponge. We have made exhaustive researches and experiments for the purpose of avoiding the vexatious inconvenience due to this contraction of the gelatinous silicate. Our invention is characterized by a mode of preparation of the gelatinous silicate outside of the battery-jars, where it is to be used, in such manner as to avoid in practice the separation of the solidifying substance and the electrolyte. By this means we have been able to impart industrial value to the use of a solidifying substance in the nature of gelatinous silicate. Prepared according to our invention the gelatinous silicate is capable, with a minimum weight, of solidifying by absorption a considerable mass (eighty per cent. of its weight) of concentrated depolarizing solutions.

In case it is desired to produce batteries (whatever may be their form) of long duration, it is advantageous to employ silicates of different preparations superposed and, if necessary, separated either by a porous cup or by a diaphragm of porous earth, or of asbestos.

As examples of the composition of two silicas we may furnish the following formulas:

*Depolarizing silica.*—First. Water, three hundred grams; bichromate of soda, one hundred and thirty grams; sulphuric acid, four hundred grams. Second. Water, two hundred grams; silicate of soda, two hundred grams. The second solution is to be poured into the first.

*Neutral silica for inclosing the zincs.*—First. Silicate of soda, three hundred grams; water, six hundred grams. Second. Hydrochloric acid, seventy-five grams; solution of sulphate of mercury, (binoxide,) ten grams; water, one hundred grams. Third. Solution of chloride of zinc at 45°, (ZnCl,) three hundred and seventy-five grams; solution of manganate chloride, (MnCl,) one hundred and twenty-five grams. The first solution is poured into the second, and the third solution is added to the mixture.

The difficulty in employing gelatinous silica lay, as we have stated, in the physical nature of the gelatinous precipitate, which is most often formed in lumps absorbing imperfectly the active substances, and in the contraction of the jelly expelling the electrolyte. We have been able by selecting proportions suited to each one of the active substances, as we have just explained, and by observing a methodical rule in the order of the mixtures to obtain at the end of a time that we are able to vary the solidification of the silica in the presence of the active solution in such manner as to be able to pour the liquid mixture into the cells of the battery, the solidification then effecting itself in the cell.

We will give an example of a dry battery according to the preceding explanations.

The view in the accompanying drawing shows an arrangement of a cylindrical battery. It is made with a cylinder A of graphite serving as the exterior cup, the bottom of which is closed by a disk $a$ of cork covered with a layer of beeswax in order to hermetically seal it. The graphite cup A is rendered impermeable and varnished exteriorly over its entire height and interiorly over its upper portion at $x\ x$. The binding-post $b$, which corresponds to the positive pole, is fixed to or integral with a divided ring $c$, which is clamped by a screw on the upper part of the graphite cup.

The graphite cup incloses at the bottom for about half its height some gelatinous silica B, serving as substratum or absorbent for a bichromate, a permanganate, a salt of mercury, &c. The upper part is filled with gelatinous silica C, simply hydrated or containing only a neutral salt, or, what is better, the conveniently-chosen salts hereinbefore specified. The zinc Z is plunged into this latter body. The upper part of the tube is plugged by a cork disk $d$, parafined and varnished. When the battery acts, the active substance of the lower silica diffuses itself little by little and slowly into the upper silica and attacks the zinc. As we have already said, the two silicas may be separated by a porous vase or a porous diaphragm.

Gelatinous silica free from chlorides may advantageously be employed for absorbing the free or concentrated solution of sulphuric acid, and thus may be applied to electric accumulators. Its electric resistance is relatively slight, and it prevents accidental interior metallic communications. The accumulators should be provided with covers for preventing the too rapid evaporation of water and the partial dessication of the gelatinous silica, which serves as a sponge.

In solutions of medium concentration (employed for electric accumulators) the strength of the sulphuric acid may be varied from ten to twenty per cent., according to the interior conductibility that it is desired to obtain. We may give as an example the following formulas for the two proportions of acid:

First. For liquor at ten per cent. of acid.—First solution: Water, three hundred grams; sulphuric acid, at sixty-six per cent., one hundred and ten grams. Second solution: Silicate of soda, at thirty-six degrees, free from chlorides, three hundred grams; water, three hundred grams. The second solution is poured into the first.

Second. For liquors at twenty per cent. of acid.—First solution: Water, three hundred grams; sulphuric acid, two hundred and fifty grams. Second solution: Silicate of soda, three hundred grams; water, three hundred grams. The second solution is likewise poured into the first.

As an excessive precaution in the preparation of primary and secondary batteries, we introduce by previous trituration some filaments of asbestus—about ten to twenty per cent.—which impart to the mass a more complete solidity.

We claim as our invention—

1. A depolarizing gelatinous silica for electric batteries, consisting of a mixture of water, bichromate of soda, and silicate of soda.

2. A neutral gelatinous silica for inclosing the negative electrodes of electric batteries, consisting of water, silicate of soda, hydrochloric acid, sulphate of mercury, chloride of zinc, and manganate chloride.

In witness whereof we have hereunto signed our names in the presence of two subscribing witnesses.

BERNARD RENAULT.
MAURICE DESVERNAY.

Witnesses:
J. L. RATHBONE,
AUGUSTE MATHIEU.